No. 812,502. PATENTED FEB. 13, 1906.
F. E. KNIGHT.
TRACTION WHEEL.
APPLICATION FILED MAY 1, 1905.

2 SHEETS—SHEET 1.

Witnesses
Inventor
F. E. Knight
By Chandler & Chandler
Attorneys

No. 812,502. PATENTED FEB. 13, 1906.
F. E. KNIGHT.
TRACTION WHEEL.
APPLICATION FILED MAY 1, 1905.

2 SHEETS—SHEET 2.

Witnesses
Inventor
F. E. Knight
By Chandler & Chandler
Attorneys

UNITED STATES PATENT OFFICE.

FRED E. KNIGHT, OF TROY, PENNSYLVANIA.

TRACTION-WHEEL.

No. 812,502.  Specification of Letters Patent.  Patented Feb. 13, 1906.

Application filed May 1, 1905. Serial No. 258,231.

*To all whom it may concern:*

Be it known that I, FRED E. KNIGHT, a citizen of the United States, residing at Troy, in the county of Bradford, State of Pennsylvania, have invented certain new and useful Improvements in Traction-Wheels; and I do hereby declare the following to be a full, clear, and exact description of the invention, such as will enable others skilled in the art to which it appertains to make and use the same.

This invention relates to wheels for farm implements, the object of the invention being to provide means adapted for attachment to the periphery of a wheel for preventing slipping and skidding of the wheel and which, furthermore, may be easily and quickly applied to and removed from the ordinary wheel without altering the structure of the latter.

Other objects and advantages of the invention will be understood from the following description.

Figure 1:
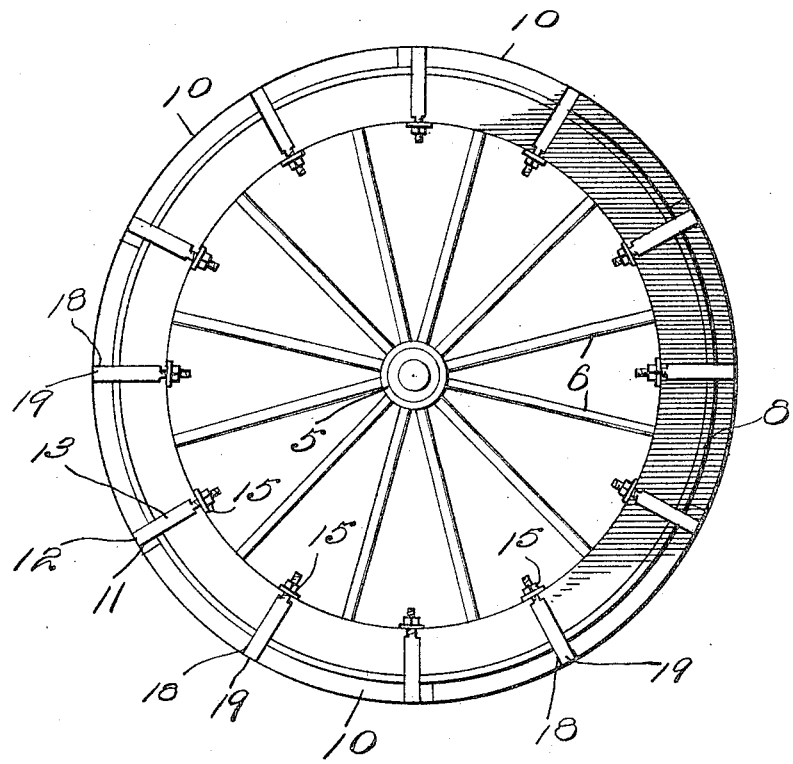
Figure 2:
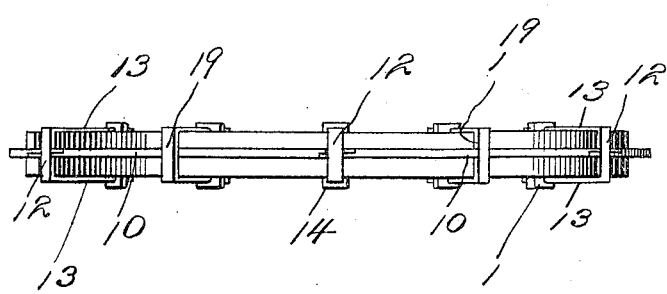
Figure 4:
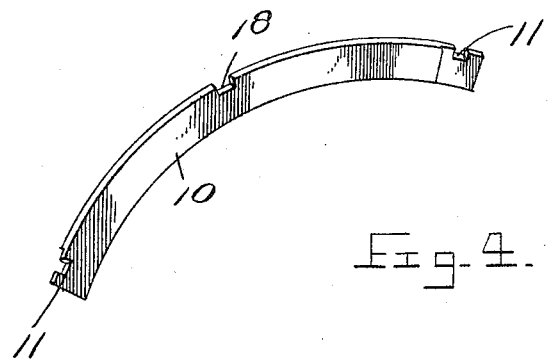
Figure 3:
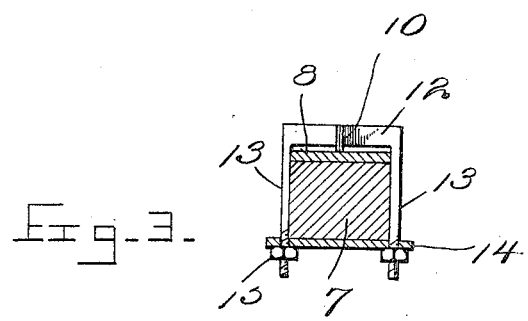
Figure 5:
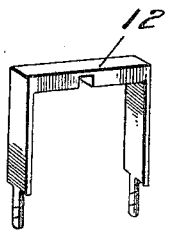

In the drawings forming a portion of this specification, and in which like numerals of reference indicate similar parts in the several views, Figure 1 is a side elevation showing an implement-wheel equipped with the present invention. Fig. 2 is a top plan view of a portion of a wheel equipped with the present invention. Fig. 3 is a transverse section through the felly and tire of a wheel equipped with the present invention. Fig. 4 is a detail view of a section of the flange. Fig. 5 is a detail view of the clamp.

Referring now to the drawings, there is shown a wheel comprising the usual hub 5, from which radiate spokes 6, that are connected to and support the felly 7, on which is arranged the usual tire 8. The present invention consists of a sectional hoop secured against the periphery of the tire. The sections of the hoop are each segmental in shape and are shown at 10, and the ends of the several segmental sections are halved and overlapped, so that when assembled as illustrated they form a continuous flange that radiates from the tire of the wheel, the side faces, as well as the top and bottom faces of mutually-adjacent segmental sections, being flush. The overlapping halved end portions of mutually-adjacent segmental sections are notched in their outer faces or edges, as shown at 11, and the notches of overlapping portions aline transversely to receive the bight portion 12 of a U-shaped clip, the legs 13 of which embrace the sides of the tire and felly of the wheel and pierce a plate 14 against the inner face of the felly and beyond which plate they are provided with nuts 15. The portion of each clip that engages the hoop-sections is notched so that the bight of the clip at each side of the sections lies in close relation to or may even touch the tire when the nuts are screwed up to draw the sections of the hoop or flange firmly against the tire. Between its ends each of the segmental sections may have an additional notch 18 to receive an additional clip 19 similar to the clip above described and operating in the same manner to more tightly hold the hoop or flange to the wheel.

It will be understood that in practice the flange or hoop may be of any desired number of sections and that any suitable materials and proportions may be used for the various parts without departing from the spirit of the invention.

What is claimed is—

The combination with a wheel, of a removable flange disposed against the periphery and comprising segmental sections having their mutually-adjacent ends halved and overlapped and provided with transversely-alining notches and retaining-clips having notched portions engaged in the alining notches of the segmental sections and embracing the felly of the wheel.

In testimony whereof I affix my signature in presence of two witnesses.

FRED E. KNIGHT.

Witnesses:
C. B. WHEELER,
F. M. SHADE.